United States Patent
Wei et al.

(10) Patent No.: US 7,020,591 B1
(45) Date of Patent: Mar. 28, 2006

(54) PARTIAL DIFFERENTIAL EQUATION MODEL FOR IMAGE FEATURE EXTRACTION AND IDENTIFICATION

(75) Inventors: Xiangshu Wei, Arcadia, CA (US); Ming Hsieh, South Pasadena, CA (US)

(73) Assignee: Cogent Systems, Inc, South Pasadena, CA (US)

( * ) Notice: Subject to any disclaimer, the term of this patent is extended or adjusted under 35 U.S.C. 154(b) by 877 days.

(21) Appl. No.: 10/047,535

(22) Filed: Jan. 15, 2002

Related U.S. Application Data

(60) Provisional application No. 60/317,219, filed on Sep. 5, 2001.

(51) Int. Cl.
*G06F 17/10* (2006.01)
(52) U.S. Cl. ............................ 703/2; 382/190; 382/192
(58) Field of Classification Search .................... 703/2; 382/190, 192, 195, 201, 206, 243, 267–282, 382/286, 299, 300, 307
See application file for complete search history.

(56) References Cited

U.S. PATENT DOCUMENTS

| | | | | |
|---|---|---|---|---|
| 5,517,419 A | * | 5/1996 | Lanckton et al. | ............ 701/216 |
| 5,754,697 A | * | 5/1998 | Fu et al. | ...................... 382/232 |
| 6,618,076 B1 | * | 9/2003 | Sukthankar et al. | ........ 348/180 |
| 6,697,538 B1 | * | 2/2004 | Angenent et al. | ............ 382/285 |

* cited by examiner

*Primary Examiner*—Albert W. Paladini
(74) *Attorney, Agent, or Firm*—Christie, Parker & Hale, LLP

(57) ABSTRACT

In one embodiment, the invention is a method for generating geometric patterns from an image having a plurality of ridges and mesh points. The method comprising the steps of: establishing a mathematical model according to regional conditions in the image; converting the mathematical model into numerical equations; solving the numerical equations; and transferring the solutions of the numerical equations to respective regions of the image.

47 Claims, 14 Drawing Sheets

(A) bifurcation (B) ridge ending (A) short ridge (B) enclosure (a)

(b)

(c)

(d)

(e)

(a)

(b)

(a)

(b)

PARTIAL DIFFERENTIAL EQUATION MODEL FOR IMAGE FEATURE EXTRACTION AND IDENTIFICATION

CROSS-REFERENCE TO RELATED APPLICATIONS

This patent application claims the benefit of the filing date of U.S. Provisional Patent Application Ser. No. 60/317,219, filed Sep. 5, 2001 and entitled "ENHANCED IMAGE MODELING"; the entire contents of which are hereby expressly incorporated by reference.

FIELD OF THE INVENTION

The present invention relates to image processing. More specifically, the invention relates to numerical modeling of biometric features, such as fingerprints.

BACKGROUND OF THE INVENTION

Fingerprint identification is one of the most important biometric related technologies. A fingerprint of a person comprises a distinctive and unique ridge pattern structure. For authentication or identification purposes, this ridge pattern structure can be characterized by endings and bifurcations of the individual ridges which is popularly known as minutiae. As a result, the accuracy of minutia extraction is crucial in the overall success of fingerprint authentication or identification.

Typically, in a good quality fingerprint image, 70–100 minutiae can be located precisely. But, in a poor quality fingerprint image, the number of minutiae that are surely and steadily extractable by common feature extraction algorithms is much less (approximately 20–50). A well-designed enhancement algorithm can dramatically improve the extraction of minutiae.

Usually, ridge pattern detection is performed manually by professional fingerprint experts. However, manual detection is tedious, time-consuming, and expensive and does not meet the performance requirements of the newly developed applications.

Most of the automatic fingerprint feature extraction methods employ conventional image processing techniques for fingerprint feature extraction and suffer from noisy artifacts of the input fingerprint image in practice. Some research in fingerprint image enhancement have been reported, for example, in L. Hong, A. K. Jain, S. Pankanti, and R. Bolle, "Fingerprint Enhancement", Proc. First IEEE WACV, pp. 202–207, Sarasota, Fla., 1996; P. E. Danielsson and Q. Z. Ye, "Rotation-Invariant Operators Applied to Enhancement of Fingerprints", Proc. Ninth ICPR, pp 329–333, Rome, 1988; and D. C. Huang, "Enhancement and Feature Purification of Fingerprint Images", Pattern Recognition, Vol. 26, no. 11, pp. 1221–1671, 1993; the contents of which are hereby incorporated by reference.

However, most of the published approaches for fingerprint image enhancement use conventional image processing technology to improve the clarity of ridge structures. Common fingerprint feature extraction algorithms employ image-processing techniques to detect minutiae. These techniques adopt only a bottom-up computational paradigm, in which no high level knowledge about fingerprint property is used to guide the processing.

Therefore, there is a need for an accurate and efficient technique for generating a geometric pattern based on visual appearances of a biometric image.

SUMMARY OF THE INVENTION

The present invention discloses a new approach for automatically generating a geometric pattern based on local visual appearances of an image, such as a fingerprint, facial images, eye iris or retina images, or any other flow-like images such as, texture images and the like. The basic idea is considering ridge patterns in the fingerprint as flow-like patterns. A second order differential equation representing the flow of fluid, is employed in describing and enhancing the different local shapes of the fingerprint. A special kind of partial differential equation is formed by transferring the original values of the fingerprint image to corresponding coefficients of the partial differential equation. The partial differential equation is solved according to a boundary condition that is determined by a local region. Therefore, a relationship between feature extraction of fingerprint and the partial differential equation is established. An enhanced image that reveals the ridge patterns of the fingerprint is obtained by mapping back the solutions of the partial differential equation into the corresponding positions in the image.

Since fingerprints are graphical flow-like ridges present on human fingers, it is possible to view the local patterns of a fingerprint as surface appearances of fluid flow and employ a mathematical model to accomplish enhancement and feature extraction. The present invention establishes a mathematical model according to local regions conditions in the fingerprint image, converts the model into numerical equations for processing by a computer, solves the numerical equations, and transfers the solutions back into the local regions of the image. Experimental results show that a model-based enhancement improves the clarity of ridge structures of fingerprint image. As a result, fingerprint feature extraction can be achieved at a more accurate and robust level.

In one aspect, the invention is a method performed by a computer for extracting features from an image, the method comprising the steps of: establishing a mathematical model according to regional conditions in the image; converting the mathematical model into numerical equations; solving the numerical equations; and transferring the solutions of the numerical equations to respective regions of the image.

In another aspect, the invention is a digital signal processor (DSP) storing a set of instructions for generating geometric pattern from an image having a plurality of ridges and mesh points. When executed, the instructions cause the DSP to perform the steps of: forming a partial differential equation by transferring values for positions in the image to corresponding coefficients of the partial differential equation; determining simultaneous difference equations corresponding to the partial differential equation and the image mesh points; solving the simultaneous difference equations; and mapping the solutions of the simultaneous difference equations to respective positions on the image to determine features of the image.

BRIEF DESCRIPTION OF THE DRAWINGS

The objects, advantages and features of this invention will become more apparent from a consideration of the following detailed description and the drawings, in which.

DETAILED DESCRIPTION

The present invention establishes numerical relationship between visual appearance of a biometric image and approximate solution of a partial differential equation with a boundary condition. This new approach differs from current methods for the fingerprint image processing. Conventional approaches employ image processing techniques for enhancement and feature extraction. In contrast, the present invention builds and utilizes a mathematical model of a local shape of the biometric image, establishes the relationship between local region status and partial differential equation, and then determines the features of the local shape by solving the numerical equations.

Figure 1:
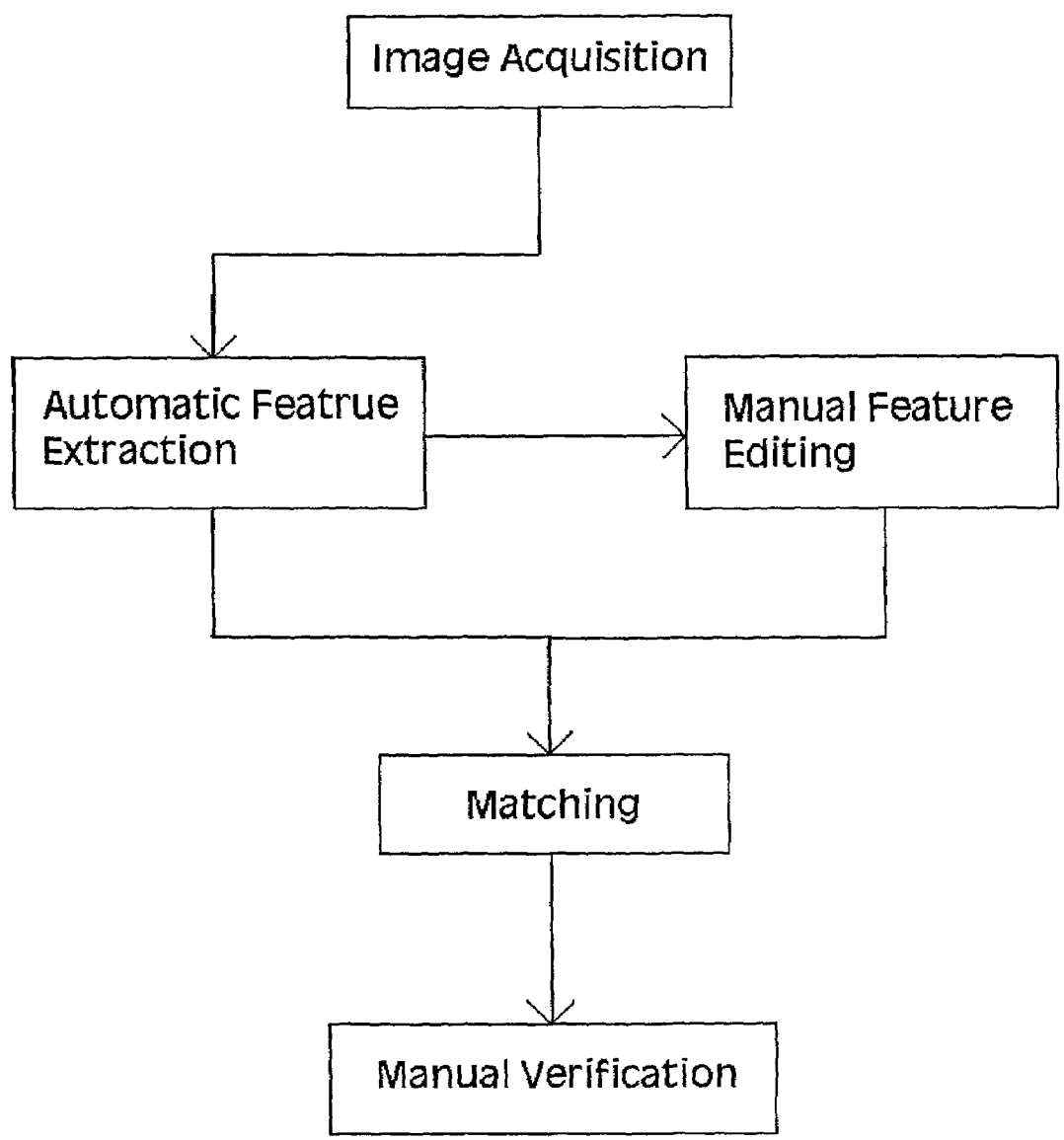
FIG. 1 is an exemplary overall flow diagram showing the common stages in a fingerprint identification system.
Figure 2:
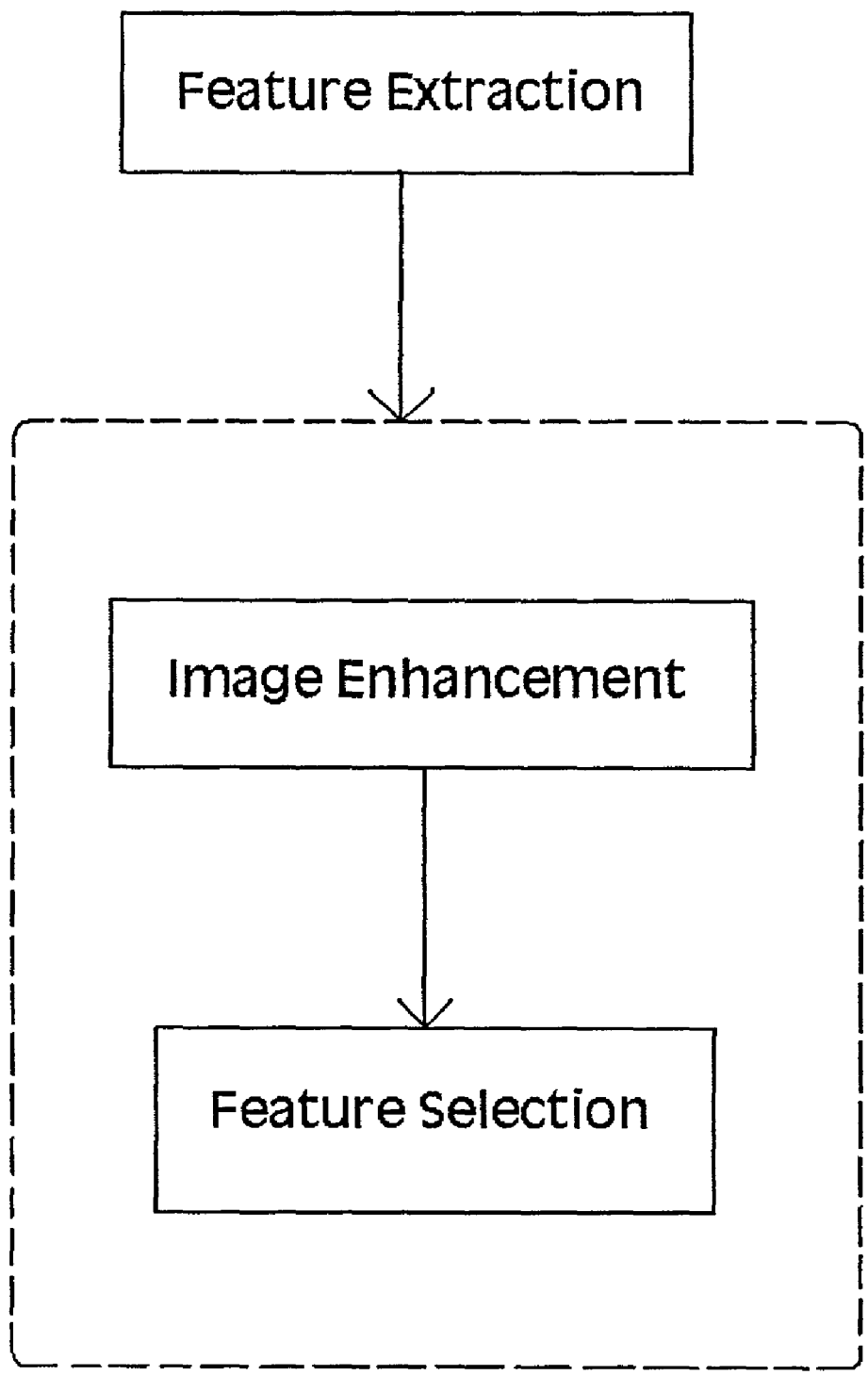
FIG. 2 is an exemplary diagram showing exemplary steps in fingerprint feature extraction.

A fingerprint identification system includes various processing stages as shown in FIG. 1. For an automatic fingerprint identification system, a precise and robust feature extraction is essential. Feature extraction can be divided into two main operations: (a) image enhancement and (b) feature selection, as shown in FIG. 2. The critical operation in feature extraction is the image enhancement due to the presence of noise in the fingerprint image. Although a fingerprint is used as an example for simplicity purposes, the techniques of the present invention can be used for other biometric images, such as palm images, facial images, eyes iris images, or any other flow-like images such as texture images and the like.

Figure 3:
FIG. 3 is an exemplary good-quality fingerprint image.

The performance of most commercially available feature extraction algorithm relies heavily on the quality of the input fingerprint images. In an ideal fingerprint image, the ridge structure can be easily detected and minutia features can be precisely located from the image. FIG. 3 shows an example of good quality fingerprint image.

Figure 4:
FIGS. 4A and 4B are exemplary views showing two commonly used fingerprint features: A. ridge bifurcation and B. ridge ending.
Figure 4:
Figure 5:
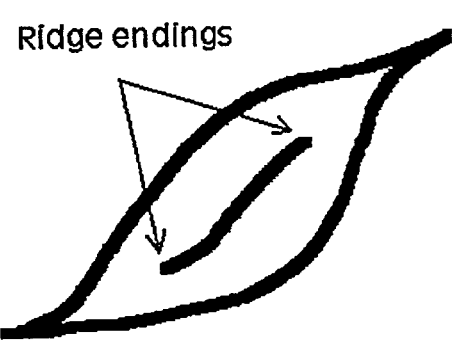
FIGS. 5A and 5B are exemplary views showing complex features of a fingerprint image as a combination of simple features: A. short ridge and B. enclosure.
Figure 5:
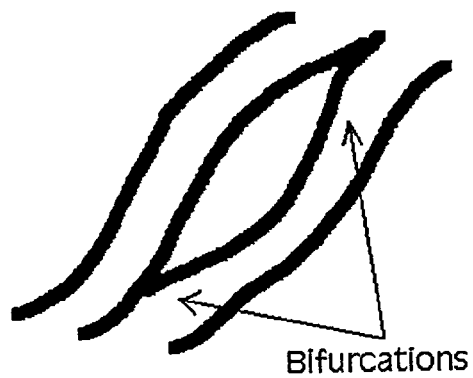

However, in practice, due to variations in acquisition devices, skin conditions, etc., most of the acquired fingerprint images are of poor quality. For example, the ridge structures are not always well defined and therefore they cannot be correctly extracted. In spite of rich information included in a fingerprint, only two kinds of features are preferably selected for identification or authentication in most current available systems. In one embodiment, the set of fingerprint features is restricted to two types of minutiae: bifurcations and ridge endings. Some examples of bifurcations and ridge endings are shown in FIGS. 4(A) and 4(B), respectively. More complex fingerprint features can be expressed as a combination of these two basic features. FIG. 5(A) gives an example of a short ridge that can be considered as a pair of ridge endings and FIG. 5(B) shows an enclosure that can be considered as a collection of two bifurcations.

Figure 6:
FIG. 6 shows an example of a local region taken from a fingerprint image.
Figure 6:
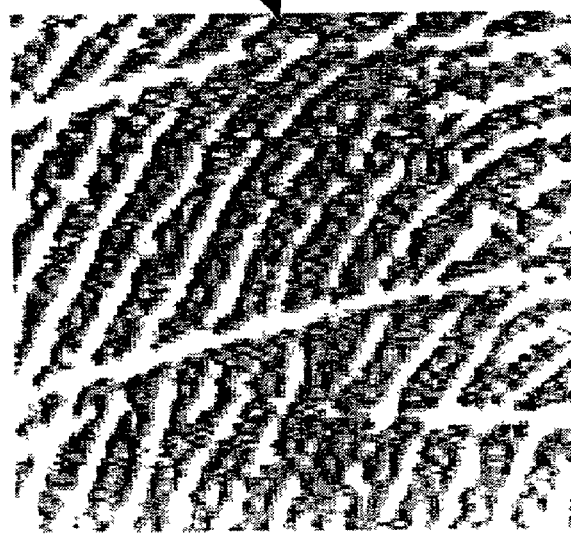

Since a minutia is a local feature of a fingerprint, the fingerprint image may be segmented into local regions. The size of each local region is selected to allow for at least two ridges in the region. Theoretically, there is no limitation on the shape of local regions. As shown in FIG. 6, for simplicity, a square region of 64*64 pixels size is cut out from the original fingerprint image to describe the following steps of the present invention.

The method of the present invention, as described below, is independent of the position of the local region. That is, the same steps can be performed on each local region of the fingerprint image for processing the entire fingerprint image. However, for simplicity reasons, the following description is related to one (local) region of the fingerprint image.

Figure 7:
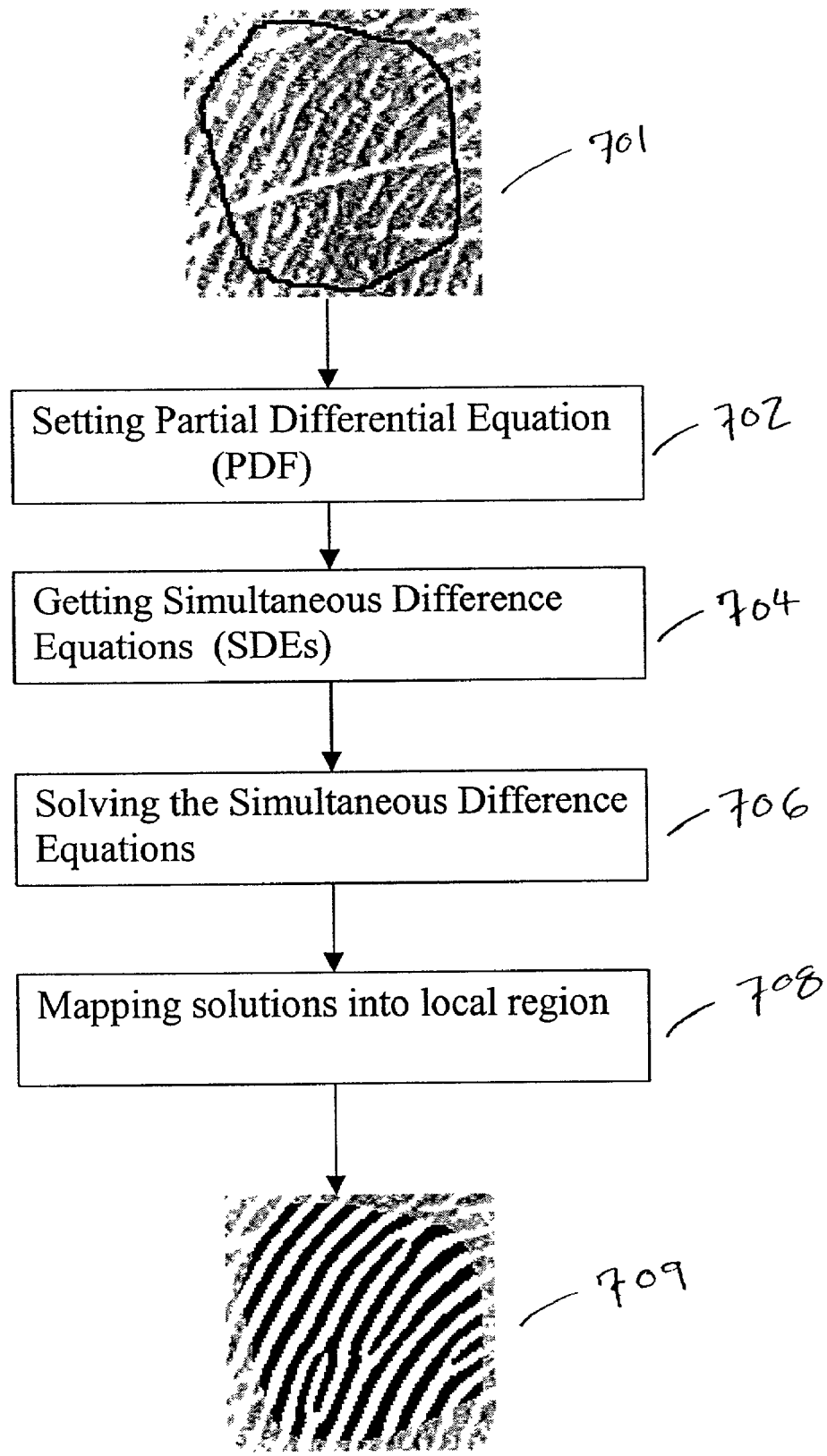
FIG. 7 is an exemplary flow chart for fingerprint feature extraction for a local region, according to one embodiment of the present invention.

FIG. 7 illustrates an exemplary flow chart for enhancing and extracting features from each local region. In block 701, some intrinsic properties of the fingerprint image are calculated according to the local ridge pattern. Then, in block 702, a partial differential equation is established by mapping the intrinsic properties into the coefficients of the equation and a boundary condition is determined. Subsequently, integralization, discretization and transformation steps are performed on the image. Each derivative and variable items of the partial differential equation with respect to each mesh points in local region of the fingerprint is replaced so as to obtain corresponding simultaneous difference equations, as shown in block 704.

A numerical method is then employed to solve the corresponding simultaneous difference equations in block 706. In block 708, the solution is mapped back into the local region of the fingerprint image. Finally, the fingerprint shape and feature are determined by using normalization and interpolation processes, as depicted in block 709.

Based on theoretical study of local patterns in fingerprint images, a mathematical model is established in terms of partial differential equation (PDE) as follow:

$$A1\frac{\partial^2 U}{\partial X^2} + A2\frac{\partial^2 U}{\partial X \partial Y} + A3\frac{\partial^2 U}{\partial Y^2} + A4\frac{\partial U}{\partial X} + A5\frac{\partial U}{\partial Y} + A6*U = 0 \quad (1)$$

Where A1, A2, A3, A4, A5 and A6 are weight coefficients of the partial differential equation.

Theoretical research and experimental results demonstrate that such model sufficiently represents almost any local shapes that appear in fingerprint images. In order to solve such special kind of partial differential equation, an initial condition and a boundary condition should be given based on a local region.

Figure 8:
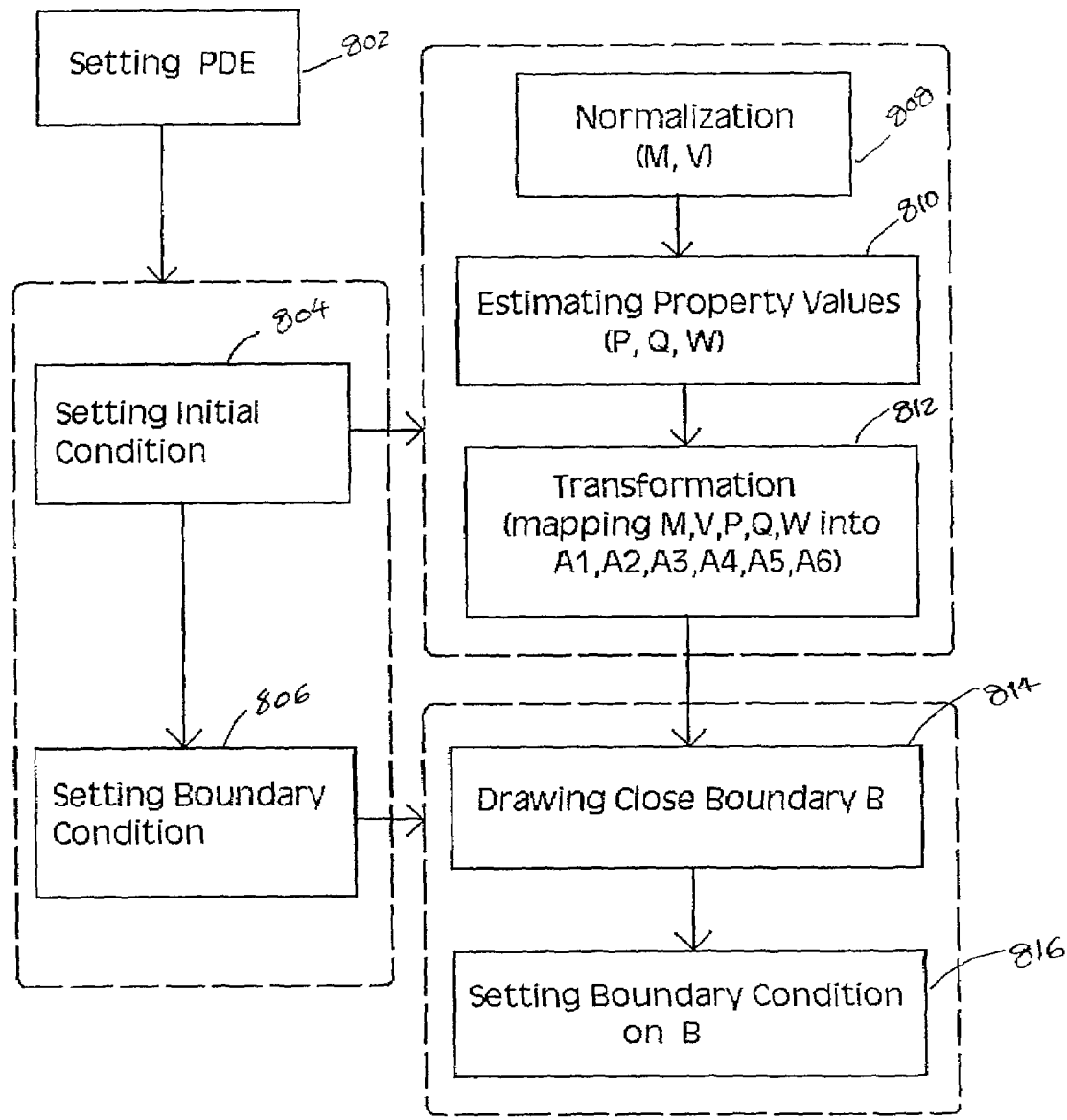
FIG. 8 is an exemplary diagram for setting partial differential equation, according to one embodiment of the present invention.

FIG. 8 is an exemplary flow chart showing steps of setting initial condition and boundary condition. Five values related to intrinsic properties of the local region are calculated to initialize the PDE (block 804). Then, the weight coefficients of the partial differential equation are determined by the intrinsic property values.

The five values M, V, P, Q and W are defined as follows:
M and V denote the estimated mean and variance of the gray-level values in the local region respectively.
P and Q are the first and second components of the local ridge oriental vector respectively.
W is the local ridge frequency.

Since local gray-level values vary in different region of fingerprint image, the local region should be normalized (block 808) so that correct mean and variance of local region can be obtained. The steps involved in normalizing algorithm are as follows:
1. The mean of the gray-level in local region R, is calculated as $$M = (1/N) \sum_{(I,J) \in R} \sum F(I, J) \quad (2a)$$

Where N is total number pixels in region R; F(I, J) is gray value of the fingerprint image at point (I, J).
2. The variance of region R is defined as $$V = (1/N) \sum_{(I,J) \in R} \sum (F(I, J) - M(F)) * (F(I, J) - M(F)) \quad (2b)$$

3. A normalized region R is determined using the following equation:

$$R(I,J)=m+\text{sqrt}((v*(F(I,J)-M)*(F(I,J)-M))/V), \text{ if }$$
$$(I,J)>M; R(I,J)=m-\text{sqrt}((v*(F(I,J)-M)*$$
$$(F(I,J)-M))/V), \text{ otherwise} \quad (2c)$$

where m and v are the desired mean and variance values, respectively.

As described above, normalization is a pixel-wise operation. The purpose of normalization is to reduce the variations in gray-level values along ridges and valleys, which facilitates the subsequent processing. Due to the presence of noise, smudges, and breaks in ridges in the input fingerprint image, the estimated local property values, P, Q, and V, may not be accurate or stable. Typical fingerprint smooth operator such as histogram modeling described in Anil K. Jain, Fundamentals of Digital image processing, Prentice Hall, Englewood Cliffs, NJ, 1989; and median filter described in Jae S. Lim, Two-dimensional Signal and Image Processing, Prentice Hall, Englewood Cliffs, NJ, 1990, the entire contents of which are hereby incorporated by reference, can be used to modify the local region.

By viewing a fingerprint image as an oriented texture, a number of methods have been proposed to estimate the ridge oriental vector of fingerprint images. For example, see, M. Kass and A. Witkin, "Analyzing oriented Patterns", Computer Vision, Graphics, and Image Processing, vol. 37, no. 4, pp. 362–385, 1987; and A. Rao, A Taxonomy for Texture Description and Identification. New York, N.Y.: Springer Verlag, 1990; the entire contents of which are hereby incorporated by reference. The main steps of ridge oriental vector estimating algorithm for estimating the property values p and Q at local region of fingerprint image, shown in block 810, are as follows:
1. Divide local region R into blocks of size b*b.
2. Compute the gradients at each pixel in R. Let ∂x (I, J) and ∂y (I, J) be the gradient magnitude in x and y directions, respectively, at pixel (I, J) of the image. The gradients are defined as $$\partial x(I,J)=(p1*F(I-d,J)+p2*F(I,J)+p3*(F(I+d,J))/p,$$
$$\partial y(I,J)=(p1*F(I,J-d)+p2*F(I,J)+p3*(F(I,J+d))/p \quad (3a)$$

Where p1, p2 are positive numbers and p2 is negative number, d is a constant expressed as step of the gradients.

$$p=p1+p2+p3;$$

3. Estimate the local orientation of each block (B(k)) centered at pixel (I, J) using the following equation:

$$\xi x(I, J) = \sum_{(u,v) \in B(k)} \sum 2 * \partial x(u, v) * \partial y(u, v), \quad (3b)$$

$$\zeta y(I, J) = \sum_{(u,v) \in B(k)} \sum (\partial \partial x(u, v) * \partial \partial y(u, v)), \quad (3c)$$

$$\theta(I, J) = (1/2)\text{atan}\{\xi x(I, J)/\zeta y(I, J)\} \quad (3d)$$

Where θ(I,J) is an estimate of the local ridge orientation at the block centered at pixel (I, J).
4. Compute the ridge oriental vector using $$P = (1/n) \sum_{(I,J) \in R} \cos(2*\theta(I, J)) \quad (4a)$$

$$Q = (1/n) \sum_{(I,J) \in R} \sin(2*\theta(I, J)) \quad (4b)$$

Where n is the total number of pixels calculated at the local region R.

With above algorithm, a fairly smooth orientation estimate can be obtained. The weight numbers p1, p2, p3 and step d are pre-determined numbers based on the block size b and the resolution of fingerprint image. Typically, fingerprint images are scanned at resolution of 500 dots per inch (dpi). In this case, the block size is defined as 5*5, and p1=p3=1, p2=−2 and d=1.

Several techniques can be used for oriental vector computing. Depending on the computational requirement, the gradient operator may vary from the simple Sobel operator described in Sanjit K. Mitra and James F. Kaiser "Handbook for Digital Signal Processing", A Wiley-Interscience Publication.

John Wiley & Sons, 1993 to a more complex Marr-Hildreth operator described in D. Marr, Vision: A Computational Investigation into the Human Representation and Processing of Visual Information. W.H. Freeman and Company. New York, 1982, the contents of which are hereby incorporated by reference.

Local ridge frequency is defined as frequency of ridge and valley structures in a local neighborhood along the direction normal to the local ridge orientation. Local ridge frequency is another intrinsic property of a fingerprint image. The steps involved in local ridge frequency estimation W are as follows:

1. Divide the local region R into small windows of size b*b. Denote the window centered at pixel (I, J) as wnd(I, J).
2. For each window centered at pixel (I, J), estimate the main oriental vector (p, q).
3. For each window centered at pixel (I, J), compute the minimal value and maximal value within a block of appropriate size, which depend directly on the resolution of the fingerprint image. In practice, as fingerprint images are scanned at resolution of 500 dpi, the size of block can be fixed at 10*10.
4. For each window centered at pixel (I, J), get a sequence of pixels that take minimal and maximal value along the direction (a, b). Where (a, b) is orthogonal vector of the main oriental vector (p, q). Denote the sequence of pixel as seq(I, J).
5. Calculate the frequency of seq(I, J) at each window centered at pixel (I, J) according to the differential value between connected elements in seq(I, J). Denote the frequency of seq(I, J) as freq(I, J).
6. Estimate the local ridge frequency by following equation:

$$W = (1/K) \sum_{(u,v) \in wnd(I,J)} \sum \text{freq}(u, v) \quad (5)$$

Frequency estimation is a window-wise operation. As described above, local ridge frequency W is obtained as the average frequency of the sequence frequency in a window. When the window to be processed contains corrupted ridges and valleys, the sequence of pixels that appear maximal or minimal value need to be well selected. In some cases, interpolations need to be performed on pixel sequence obtained in that window.

Once the values M, V, P, Q and W corresponding to the fingerprint intrinsic properties of the local region R are determined, a transformation that maps local intrinsic properties M, V, P, Q and W into weight coefficients of a special partial differential equation is performed, as illustrated in block 812. As a result, a partial differential equation (1) that describes the ridge pattern of the partial fingerprint image is formed. The weight coefficients, A1, A2, A3, A4, A5 and A6 are determined by the following transformation:

$$A1 = P*P*(P*P+Q*Q)*W*W, \quad (6a)$$

$$A2 = 2*(\text{sqrt}(u*u - P*P*W*W)*\text{sqrt}(v - Q*Q*W*W))/W, \quad (6b)$$

$$A3 = Q*Q(P*P+Q*Q)*W*W, \quad (6c)$$

$$A4 = u*q + v, \quad (6d)$$

$$A5 = -v*p - u, \quad (6e)$$

$$A6 = a*(P*P + Q*Q) + b \quad (6f)$$

Where a, b, u, v are constants, specified as initial parameters at system setup.

Well-selected constants improve the performance of overall system. In one implementation, a simulation of the partial differential equation for setting optimal initial parameters for system and evaluation of results shows that the selection of constants involves a trade-off between complexity and accuracy. That is, the more optimal the parameters, the more sophisticated ridge information may be created but, the partial differential equation would be more prone to noise. On the other hand, the less optimal the parameters, the less noise prone the system is and less computation time is required. However in this case, detailed ridge shape loss increases.

The PDE is completely determined by intrinsic properties of the local region as its boundary conditions. In order to create boundary conditions for the PDE, a close boundary is drawn out manually, or by a computer routine within the respective local region, as shown in block 814. The boundary conditions are then set in block 816. For example, B is denoted as a boundary in local region R. The partial differential equation (1) including the following boundary condition expresses a solvable mathematical problem.

$$U\Big|_{(x, y) \in S} = B1(x, y), \quad \frac{\partial U}{\partial s}\Big|_{(x, y) \in S} = B2(x, y) \quad (7)$$

Where S is a continuous boundary defined on the discrete boundary B, B1(x, y) and B2(x, y) are the continuous function and differentiable function defined on the boundary S, respectively.

As mentioned above, the enhancement of local ridge shape of fingerprint is considered as the solution of the corresponding PDE under boundary condition. So far, the relationship between a special partial differential equation which governs a fluid flow phenomenon and local intrinsic properties of a fingerprint image is established and the boundary condition related to the gray-level variations of local region in the fingerprint is determined. Next, the partial differential equation needs to be solved with the given boundary condition and the solution to be applied to the local regions of the fingerprint.

Figure 9:
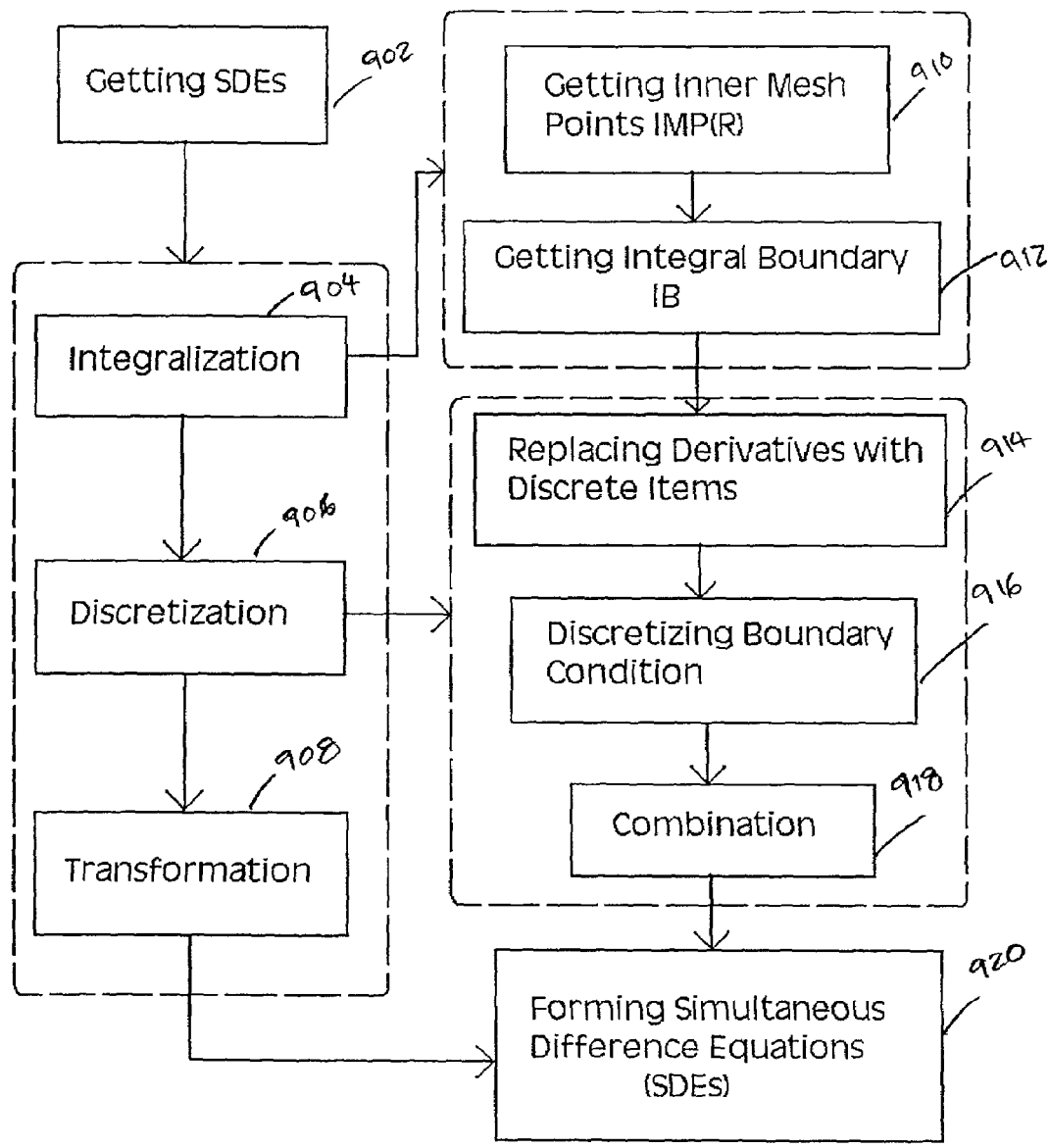
FIG. 9 is an exemplary diagram for getting simultaneous difference equations, according to one embodiment of the present invention.

In order to numerically solve the PDE in equation (1) with given boundary condition (7) by a computer, three processes namely, integralization, discretization and transformation are performed on the respective local region with the PDE and the boundary condition. FIG. 9 is an exemplary block diagram showing overall procedures involved in solving the PDE (block 706 of FIG. 7).

Integralization step of block 904 produces a group of integral points within the local region R and an integral boundary IB (block 912):

1. Let's denote two directions of the coordinate axes of the fingerprint image as X-direction and Y-direction. Along with X-direction and Y-direction, integral points carry out at a desired step length H as follow:

$$X(I)=X0+I*H, I=0, 1, 2, \ldots, W(F); \quad (8a)$$

$$Y(J)=Y0+J*H, J=0, 1, 2, \ldots, H(F). \quad (8b)$$

Where, (X0, Y0) is top left point of the image, W(F) is the width of the image and H(F) is the height of the image.

2. Map the above integral points into the local region R. Refer to the integral points within region R as inner mesh points of R. Denote the overall inner mesh points of R as IMP(R).

3. An integral boundary IB is formed by selecting the nearest inner mesh points of R.

When the integralization process for inner mesh points and mesh points near boundary line is completed, a discretization based on mesh points is performed for numerating the partial differential equation (1) and the boundary condition (7), as shown in block 906. First, derivatives are replaced with respect to each inner mesh point (block 914), within the original partial differential equation (1), for obtaining a corresponding numerical equation. The replacing rules are defined as follow:

$$\frac{\partial U}{\partial X} \approx [U(X+H, Y) - U(X, Y)]/H \quad (9a)$$

$$\frac{\partial U}{\partial Y} \approx [U(X, Y+H) - U(X, Y)]/H \quad (9b)$$

$$\frac{\partial^2 U}{\partial X^2} \approx [U(X+H, Y) - 2*U(X, Y) + U(X-H, Y)]/(H*H) \quad (9c)$$

$$\frac{\partial^2 U}{\partial Y^2} \approx [U(X, Y+H) - 2*U(X, Y) + U(X, Y-H)]/(H*H) \quad (9d)$$

$$\frac{\partial^2 U}{\partial X \partial X} \approx [U(X+H, Y+H) - U(X+H, Y) - U(X, Y+H) + U(X, Y)]/(H*H) \quad (9e)$$

Where (X, Y) is inner mesh point in IMP(R).

Figure 10:
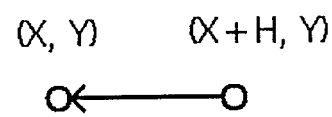
FIG. 10A is an exemplary drawing of two adjacent discrete points for discretization of first derivatives along with X-direction, according to one embodiment of the present invention.
FIG. 10B is an exemplary drawing of two adjacent discrete points for discretization of first derivatives along with Y-direction, according to one embodiment of the present invention.
FIG. 10C is an exemplary drawing of three adjacent discrete points for discretization of second derivatives along with X-direction, according to one embodiment of the present invention.
FIG. 10D is an exemplary drawing of three adjacent discrete points for discretization of second derivatives along with Y-direction, according to one embodiment of the present invention.
FIG. 10E is an exemplary drawing of four adjacent discrete points for discretization of mixed derivatives, according to one embodiment of the present invention.
Figure 10:
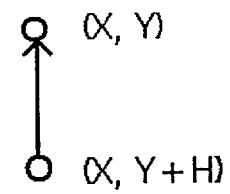
Figure 10:
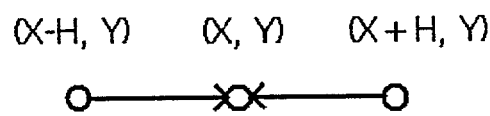
Figure 10:
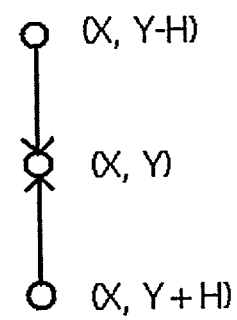
Figure 10:
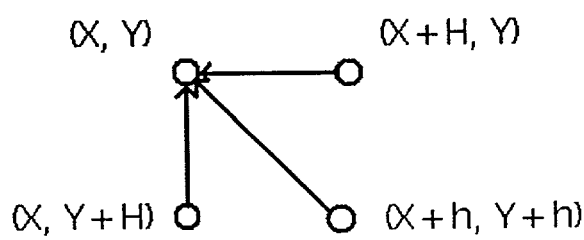
Figure 11:
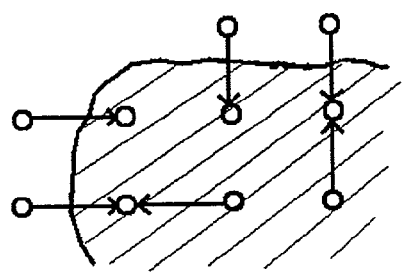
FIG. 11A is an exemplary drawing for performing first and second derivatives discrete by selecting referent points as adjacent points near a boundary line, according to one embodiment of the present invention.
FIG. 11B is an exemplary drawing for mixing derivatives discrete by selecting referent points as adjacent points near a boundary line, according to one embodiment of the present invention.
Figure 11:
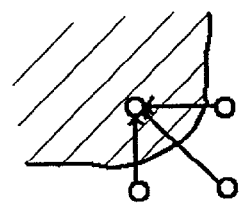

Note that each derivative included in the original partial differential equation (1) is converted into a discretized equation. In other words, the numerical equation is the result of discretization based upon the integration of inner points within the boundary B. The first derivative of the partial differential equation is expressed as a difference of two adjacent discrete points, as shown in FIGS. 10(*a*) and 10(*b*). The second derivative of the equation includes three adjacent discrete points, as shown in FIGS. 10(*c*), and 10(*d*). The mix derivative (9*e*) depends on four discrete points, as shown in FIG. 10(*e*). In some cases, especially in the location near the boundary, an inner mesh point may not have enough adjacent points to support derivatives replacement. Thus, neighboring points outside of local region should be selected as adjacent points. FIG. 11(*a*) gives an example of first and second derivatives select neighboring points as adjacent points. FIG. 11(*b*) shows a mix derivatives replacement supporting by three neighboring points.

Figure 12:
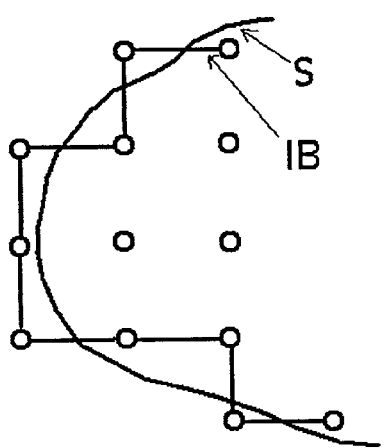
FIG. 12A illustrates the relationship between a continuous boundary and a discrete boundary.
FIG. 12B illustrates the discretization of the continuous and differentiable function on a numerical boundary.
Figure 12:
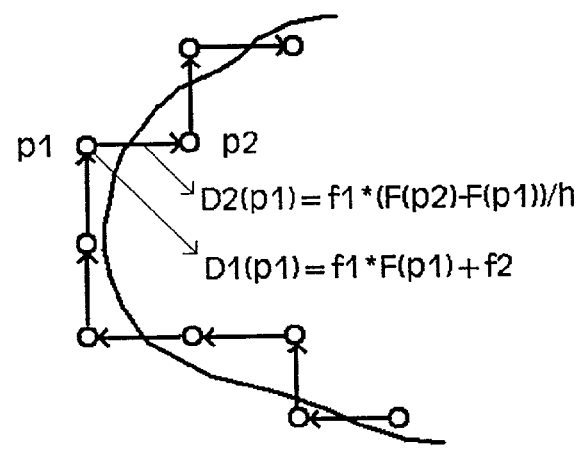
Figure 13:
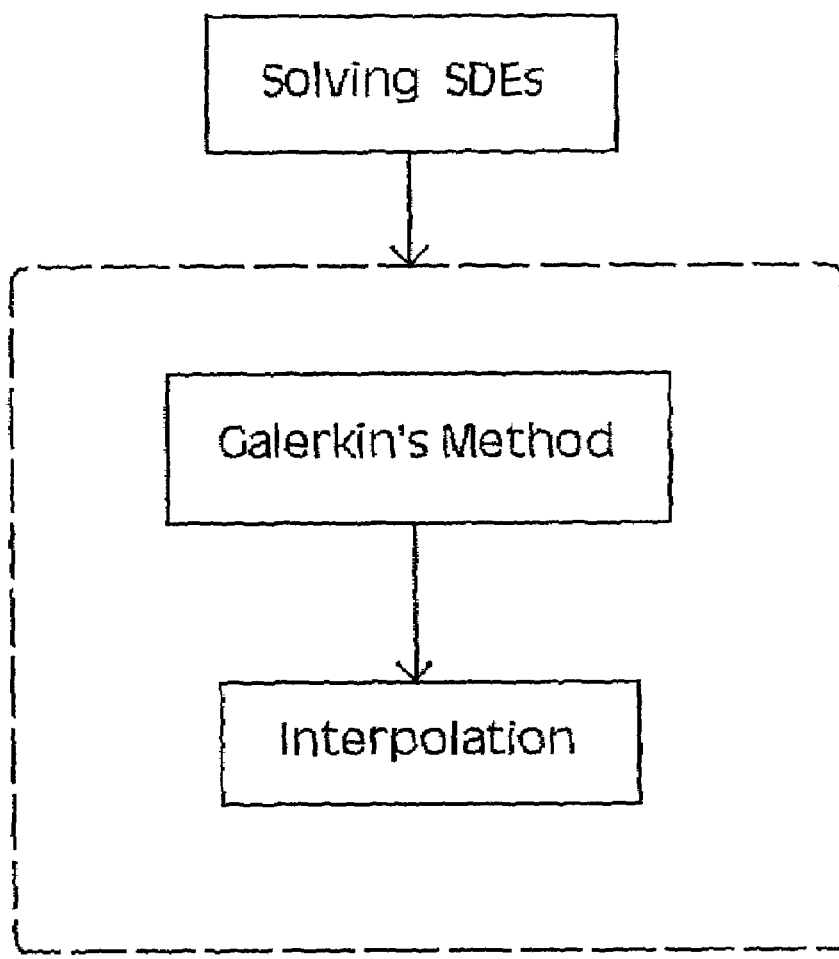
FIG. 13 is an exemplary flow chart showing the steps performed for solving a SDE, according to one embodiment of the present invention.

Second, similar replacing rules can be used to convert the boundary condition (7) into a numerical condition with respect to each integral point of boundary IB, as shown in block 916. The relationship between a continuous boundary S and a numerical boundary IB is shown in FIG. 12(*a*). In the original boundary condition (7), the continuous function B1(x, y) defined on the continuous boundary S is replaced with a numerical function D1 (X, Y) defined on a numerical boundary IB. The numerical function D1(X, Y) is carried out by following expression:

$$D1(X,Y)=f1*F(X,Y)+f2, (X,Y)\in IB \quad (10)$$

Where f1 and f2 are constants that are predetermined according to the brightness and contrast of the image and F(X, Y) is the gray value at point (X, Y) on the integral boundary IB. The differentiable function B2(x, y) defined on the continuous boundary S is replaced with a numerical function D1 (X, Y) defined on a numerical boundary IB. The numerical function D2(X, Y) is carried out by following expression:

$$D2(X,Y)=f1*[F(X1,Y1)-F(X,Y)]/h, (X,Y)\in IB\ h=\text{sqrt}((X1-X)*(X1-X)+(Y1-Y)*(Y1-Y)); \quad (11)$$

Where (X1, Y1) is an integral point on IB which is selected as the next adjacent point along the boundary line IB. FIG. 12(*b*) is an exemplary diagram for explaining the discretization of the continuous and differentiable function on a numerical boundary IB. Finally, combining the numerical derivatives of the partial differential equation and numerical boundary condition (block 918), the original partial differential equation (1) with the boundary condition (7) is expressed as an approximate numerical partial differential equation with numerical boundary condition using the following replacements:

1. Each first derivative included in the original partial differential equation (1) is replaced with the discrete form according to the expression (9a) and (9b).
2. Each second derivative included in the original partial differential equation (1) is replaced with the discrete form according to the expression (9c) and (9d).
3. The mix derivative in the original partial differential equation (1) is replaced with the discrete form according to the expression (9e).
4. The continuous function U(X, Y) in the boundary condition (7) is replaced with the discrete function F(I, J) which (I, J) is inner mesh point of local region.
5. The continuous function B1(x, y) and the differentiable function B2(x, y) in the boundary condition(7) is replaced with a numerical functions according to the expression (10) and (11), respectively.
6. Combing the same items and reducing the void expression, the original PDE (1) with (7) is expressed as a discrete formula:

$$C1*U(I+H,J+H)+C2*U(I+H,J)+C3*U(I,J+H)+C4*U(I-H,J)+C5*U(I,J-H)+C6*U(I,J)=0; \quad (12)$$

$$U(I0,J0)=f1*F(I0,J0)+f2 \text{ and } U(I1,J1)-U(I0,J0)=(F(I1,J1)-F(I0,J0))/h. \quad (13)$$

Where (I, J) is a inner mesh point of the local region of the fingerprint image, (I0, J0) and (I1, J1) are adjacent points along the numerical boundary line, H is a predetermined step length and h is the distance between two points (I0, J0) and (I1, J1). The coefficients C1, C2, C3, C4, C5 and C6 are determined by following expressions:

$$C1=A2/(H*H); \quad (14a)$$

$$C2=[A1/(H*H)-A2/(H*H)+A4/H]; \quad (14b)$$

$$C3=[A3/(H*H)-A2/(H*H)+A5/H]; \quad (14c)$$

$$C4=A2/(H*H); \quad (14d)$$

$$C5=A3/(H*H);\tag{14e}$$

$$C6=[A2/(H*H)-2*A1/(H*H)-2*A3/(H*H)-A4/H-A5/H+A6].\tag{14f}$$

Eventually, the original PDE (1) with boundary condition (7) is completely converted to a discrete representation (12) under discrete boundary condition (13). At each mesh point (I, J) in local region, executing the discretization produce at least one equation as expressed as (12) about six neighboring points (I+H, J+H), (I+H, J), (I, J+H), (I−H, J), (I, J−H), (I, J). On the discrete boundary, more equations would be produced.

Referring to block 908, through following transformation, a simultaneous discrete equation, commonly referred to as simultaneous difference equations (SDE), is formed. Considering each mesh point value U(I, J) in local region as variable to be solved, a group of equations about mesh point values are obtained as expressed as (12) and (13). Putting such equations together and departing the coefficients from the variables, the equations are transferred into simultaneous format that is expressed as follows.

$$A\{U\}=c\tag{15}$$

Where A is coefficients item, U is variables item and c is a constant item.

According to the numerical operations described above, the simultaneous difference equations to be handled are limited to the orthogonal mesh points which spread over a given region, and the numerical operations (referred to as integralization, discretization and transformation) are calculated only for the mesh points. That is, the simultaneous difference equations can be modified only in the position where the image points are selected as inner mesh points. For such reason, preferably an optimal mesh point selection should be done before the numerical operation. The step length H is flexible and can be set according to different criteria. For example, longer step length may be chosen at a region where the frequency of the ridge pattern is low, or shorter step length may be chosen at higher ridge frequency region to generate more inner mash point.

The more inner mesh points are generated, the more discrete equations are transformed into the simultaneous difference equations. As a result, the simultaneous difference equations to be analyzed become larger in size and the computation time required for solving these equations increases in proportion to the size of the equations. Taking the computation time and memory requirement into account, a variable step length can be chosen so that the simultaneous difference equations can be optimally determined based on different scenarios.

Figure 15:
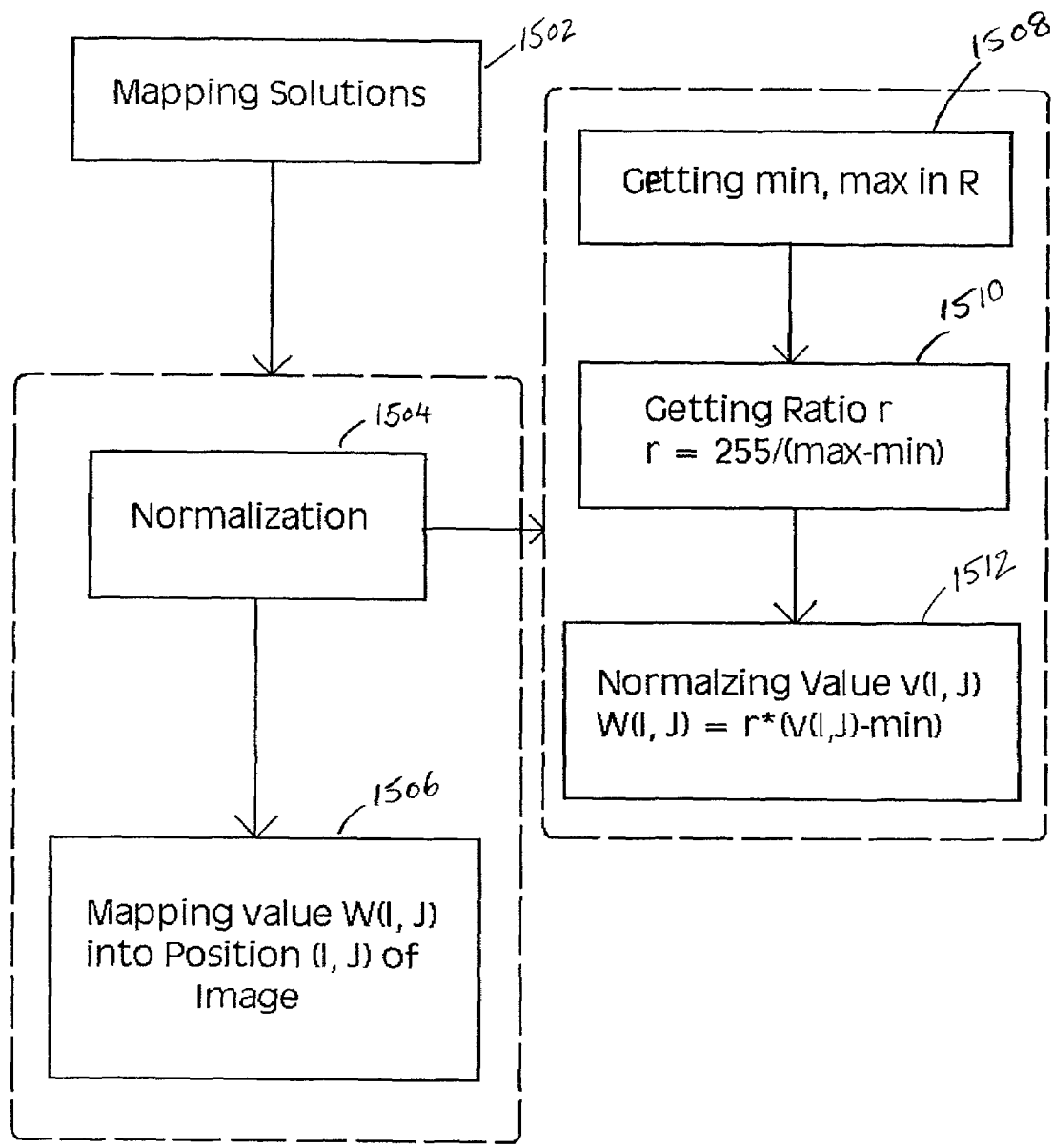
FIG. 15 illustrates the operation of mapping a SDE solution back into an image, according to one embodiment of the present invention.

By performing the integralization, discretization and transformation steps in block 920, the original partial differential equation (1) with boundary condition (7) is replaced by the simultaneous difference equations (SDE) that includes discrete values. That is, the original equation (1) with (7) is approximated as a group of discrete equations. The numerical solution of the SDE may be carried out by a general-purpose computer. FIG. 15 depicts an exemplary flow chart of the steps performed for solving the SDE.

Referring back to block 706 of FIG. 7, several conventional methods such as finite element method can be employed to solve the simultaneous difference equations. Considering the style and limitation of the simultaneous difference equations, Galerkin's method (described in J. N. Reddy. "An Introduction to the Finite Element Method" McGraw-Hill, Inc., 1993, the contents of which are hereby incorporated by reference) is employed to solve the simultaneous difference equations. The detailed description of Galerkin's method is beyond the scope of this invention. As a reference, main steps of Galerkin's method are described as following:

1. Express the simultaneous difference equations in a standard from as $$A\{U\}=f\tag{16}$$

Where A is a coefficient item and U is the object item.

2. Select a complete element sequence $\{V(k)\}(k=1, 2, 3, YY)$, and a appropriate number n.
3. Take a approximate solution which express as $$U(n)=\Sigma a(k)*V(k)\tag{17}$$

Where a(k) are constants to be determined.

Insert the approximate solution into the expression (16) and multiple both sides of the expression by V(k) so that simultaneous algebra equations with respect to a(k) are obtained as $$\sum a(k)*(A*V(k), V(j)) = (f, V(j)) \ (j=1, 2 \ldots, n)\tag{18}$$

4. Get the solution of a(k) and replace back into the expression (16), the approximate solution U(n) is obtained.

As described above, when a point in the fingerprint image is selected as a mesh point and discretization is achieved, an enhanced value can be approximated by using Galerkin's method. In a case where the image position is not on the mesh point, interpolation is used to calculate the value. In other words, the enhanced value at a position other than a mesh point is interpolated based on the value of the neighboring mesh points. An exemplary process of interpolation is described as follow:

1. For each point (x, y) which is not selected as a mesh point in the image, get the neighboring mesh points sequence:

$$P(i,j)=(x(i),y(j)) i=1, 2, \ldots, m; j=1, 2, \ldots, n.$$

The corresponding value sequence is expressed as:

$$\{v(i, j)\} \ i=1, 2, \ldots, m; j=1, 2, \ldots, n.$$

2. Set a Lagrange polynomial with respect to x as:

$$\alpha(x,i)=\omega(x)/((x-x(i))*\tau(x(i)) i=1, 2, \ldots, m\tag{19a}$$

Where $\omega(x)$ and $\tau(x(i))$ are defined as $$\omega(x)=\Pi(x-x(i))\tag{19b}$$

$$\tau(x(i))=(x(i)-x(1))*\ldots(x(i)-x(i-1))*(x(i)-x(i+1))*\ldots(x(i)-x(n))\tag{19c}$$

3. Set a Lagrange polynomial with respect to y as:

$$\beta(y,j)=\omega(y)/((y-y(j))*\tau(y(j)) j=1, 2, \ldots n\tag{19d}$$

Where $\omega(y)$ is defined as $$\omega(y)=\Pi(y-y(j))\tag{19e}$$

and $\tau(y(j))$ is defined as $$\tau(y(j))=(y(j)-y(1))*\ldots(y(j)-y(j-1))*(y(j)-y(j+1))*\ldots(y(j)-y(n))\tag{19f}$$

4. Calculate the value at point (x, y) as $$v(x, y) = \sum \sum v(i, j)*\alpha(x, i)*\beta(y, j)\tag{19g}$$

Figure 14:
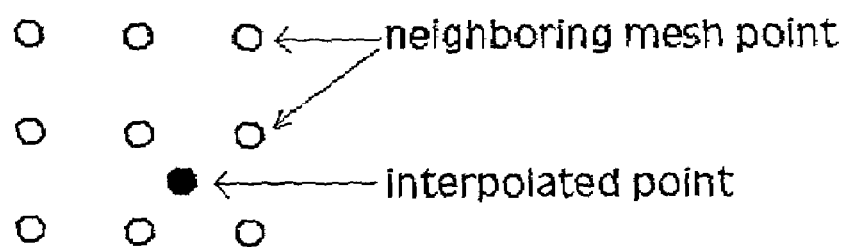
FIG. 14 shows an interpolated point and its 3*3 neighboring mesh points.

Accordingly, there may be a variation in the interpolation precision depending on the manner the neighboring mesh points sequence is obtained. In one embodiment, neighboring mesh points sequence is quadratically selected and both size m and n are set to 3. FIG. 14 shows an interpolated point and its 3*3 neighboring mesh points.

After applying the above steps to all the local regions of the fingerprint image, a solution for each pixel in the image is obtained with different precision. The gray level precision of image for computer processing is typically set to 8-bit (namely a byte) in which the minimum gray value is 0 and maximum gray value is 255. A normalization process described as follow is then used to map the solution back into the image.

FIG. 15 illustrates the operation of mapping the SDEs solution back into the image (block 1502). As depicted in block 1508, for each local region R, minimum value and maximum value is calculated in the solution, and the minimum and maximum value denoted as min (R) and max (R), respectively. In block 1510, the ratio value r (R)=255/(max (R)−min(R)) is obtained. For each point (I, J) in the region R, the solution at point (I, J) is denoted as v(I, J)*3. In block 1512, w(I, J) is mapped into gray level byte at the position (I, J) as W(I, J)=r(R)*(v(I, J)−min(R)).

Figure 16:
FIG. 16 shows an exemplary result of local solution mapping.
Figure 17:
FIG. 17 shows an exemplary enhanced image obtained by mapping a solution to the entire area of an original fingerprint image.
Figure 1:
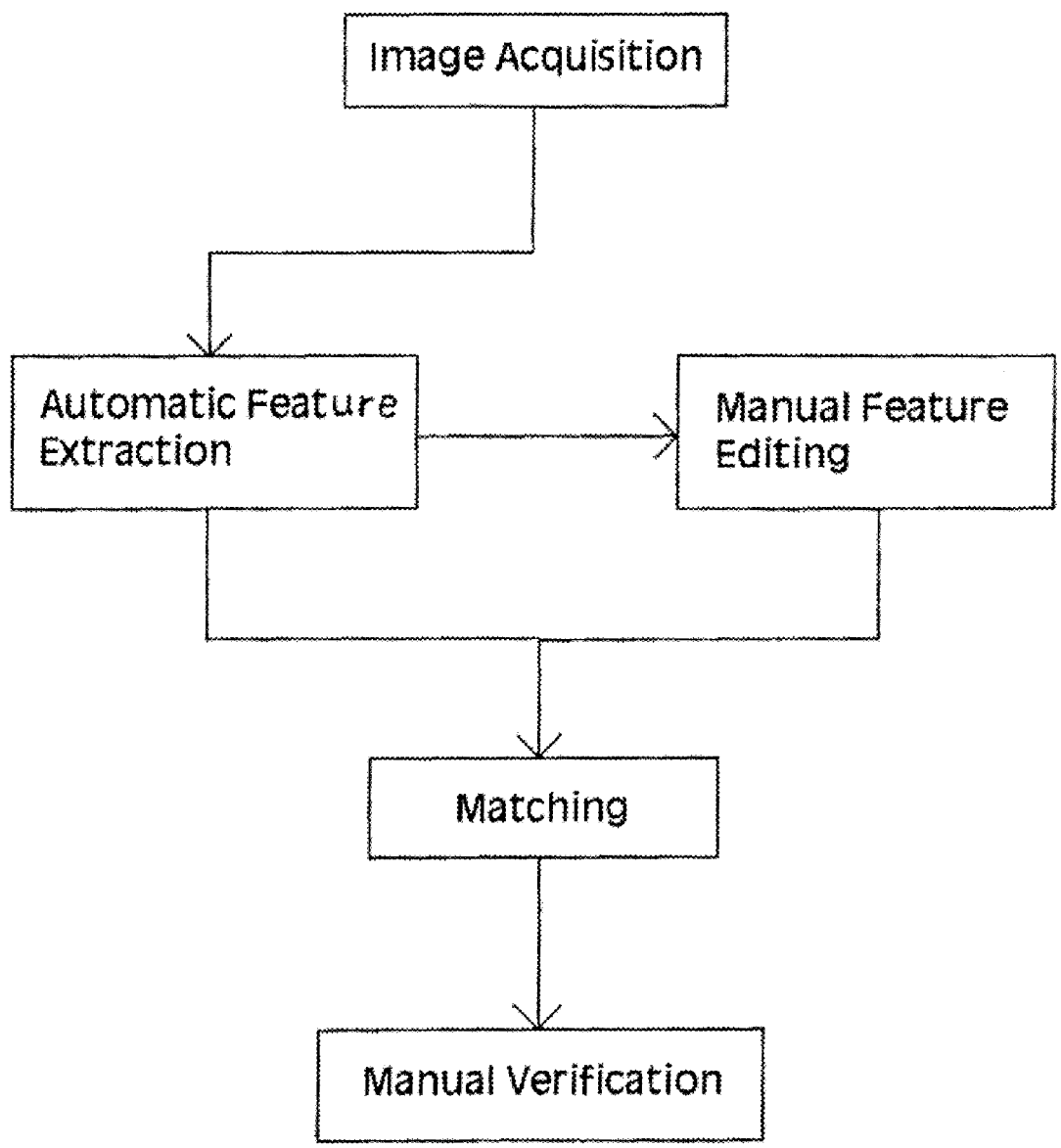

The local region R is then enhanced by placing the value W(I, J) at position (I, J). The size of local region R in normalization is set in such a manner to cover at two ridges. FIG. 16 shows an exemplary result of local solution mapping. FIG. 17 shows an exemplary enhanced image that is obtained by mapping the solution to the entire original fingerprint image.

The present invention may be implemented by a computer software programmed to perform the steps involved. Alternatively a Digital Signal Processor (DSP) chip may be programed to perform the steps of the present invention. In another embodiment, a special electronic circuit, such as an Integrated Chip (IC), maybe designed to carry out the steps of the present invention.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention, as defined by the appended claims.

The invention claimed is:

1. A method performed by a computer for generating a geometric pattern from an image having a plurality of ridges and mesh points, the method comprising the steps of:
    forming a partial differential equation by transferring values for positions in the image to corresponding coefficients of the partial differential equation;
    determining simultaneous difference equations corresponding to the partial differential equation and the image mesh points;
    solving the simultaneous difference equations; and
    mapping the solutions of the simultaneous difference equations to respective positions on the image to determine features of the image.

2. The method of claim 1, wherein the image is a fingerprint.

3. The method of claim 1, wherein the image is a facial image.

4. The method of claim 1, wherein the image is a hand-palm image.

5. The method of claim 1, wherein the image is an eye iris image.

6. The method of claim 1, wherein the image is a texture image.

7. The method of claim 1, wherein the image is an eye retina image.

8. The method of claim 1, wherein the step of forming a partial differential equation comprises the steps of:
    calculating a plurality of intrinsic properties of the image according to image ridge pattern;
    mapping the plurality of intrinsic properties into coefficients of the partial differential equation; and
    determining a boundary condition for the partial differential equation from the image to establish a relationship between properties of the image and the partial differential equation.

9. The method of claim 1, wherein the step of determining simultaneous difference equations comprises the step of replacing each derivative and variable items of the partial differential equation with respect to each mesh point in the image.

10. The method of claim 1, wherein the step of forming a partial differential equation comprises the steps of:
    determining initial conditions for the partial differential equation; and
    determining boundary condition for the partial differential equation.

11. The method of claim 10, wherein the step of determining initial conditions comprises the steps of:
    normalizing the image to reduce variations in gray-level values along ridges of the image;
    estimating property values of the image; and
    mapping the estimated property values into weight coefficients of the partial differential equation.

12. The method of claim 11, wherein the step of normalizing comprises the steps of:
    determining M, mean of the gray-level in a region R by computing $$M = (1/N) \sum_{(I,J) \in R} \sum F(I, J) \qquad (2a)$$

where N is total number pixels in the region R; F(I, J) is gray value of the image at point (I, J);
    determining V, variance of the region R by computing $$V = (1/N) \sum_{(I,J) \in R} \sum (F(I, J) - M(F)) * (F(I, J) - M(F)); \qquad (2b)$$

and
    determining a normalized region R by computing $$R(I,J)=m+\text{sqrt}((v*(F(I,J)-M)*(F(I,J)-M))/V, \text{ if } (I,J)>M; R(I,J)=m-\text{sqrt}((v*(F(I,J)-M)*(F(I,J)-M))/V, \text{ otherwise tm (2c)}$$

where m and v are the desired mean and variance values, respectively.

13. The method of claim 11, wherein the step of estimating property values comprises the steps of:
    dividing a region R into blocks of size b*b as B(k);
    computing gradients at each pixel in R as $$\partial x(I,J)=(p1*F(I-d,J)+p2*F(I,J)+p3*(F(I+d,J))/p,$$
$$\partial x(I,J)=(p1*F(I,J-d)+p2*F(I,J)+p3*(F(I,J+d))/p \qquad (3a)$$

where (I, J) and (I, J) are the gradient magnitude in x and y directions at pixel (I, J) of the image respectively, p1, p2 are positive numbers, p3 is negative number, and d is a constant expressed as step of the gradients p=p1+p2+p3;

estimating local orientation of each block (B(k)) centered at pixel (I, J) by computing $$\xi x(I, J) = \sum_{(u,v)\in B(k)} \sum 2*\partial x(u, v) * \partial y(u, v), \quad (3b)$$

$$\zeta y(I, J) = \sum_{(u,v)\in B(k)} \sum (\partial\partial x(u, v) * \partial\partial y(u, v)), \quad (3c)$$

$$\theta(I, J) = (1/2)\text{atan}\{\xi x(I, J)/\zeta y I, J)\} \quad (3d)$$

Where θ(I,J) is an estimate of the local ridge orientation at the block centered at pixel (I, J);
computing ridge oriental vector as $$P = (1/n) \sum_{(I,J)\in R} \cos(2*\theta(I, J)) \quad (4a)$$

$$Q = (1/n) \sum_{(I,J)\in R} \sin(2*\theta(I, J)) \quad (4b)$$

where P and Q are first and second components of the ridge oriental vector, respectively, and n is the total number of pixels calculated at the local region R;
for each block centered at pixel (I, J), computing the minimal value and maximal value the pixel;
for each block centered at pixel (I, J), computing a sequence of pixels seq(I, J) that take minimal and maximal value along the direction (a, b), where (a, b) is orthogonal vector of the main oriental vector (p, q);
computing freq(I, J), frequency of seq(I, J) at each block centered at pixel (I, J) according to the differential value between connected elements in seq(I, J); and
estimating a local ridge frequency W by computing $$W = (1/K) \sum_{(u,v)\in wnd(I,J)} \sum \text{freq}(u, v). \quad (5)$$

14. The method of claim 11, wherein the step of mapping comprises the step of determining weight coefficients, A1, A2, A3, A4, A5 and A6 of a partial differential equation $$A1\frac{\partial^2 U}{\partial X^2} + A2\frac{\partial^2 U}{\partial X\partial Y} + A3\frac{\partial^2 U}{\partial Y^2} + A4\frac{\partial U}{\partial X} + A5\frac{\partial U}{\partial Y} + A6*U = 0 \quad (1)$$

by computing $$A1=P*P*(P*P+Q*Q)*W*W, \quad (6a)$$

$$A2=2*(\text{sqrt}(u*u-P*P*W*W)*\text{sqrt}(v-Q*Q*W*W))/W, \quad (6b)$$

$$A3=Q*Q(P*P+Q*Q)*W*W, \quad (6c)$$

$$A4=u*q+v, \quad (6d)$$

$$A5=-v*p-u, \text{ and} \quad (6e)$$

$$A6=a*(P*P+Q*Q)+b \quad (6f)$$

where a, b, u, v are constants.

15. The method of claim 10, wherein the step of determining boundary condition comprises the steps of:
drawing a close boundary within the image; and
setting boundary condition on the drawn boundary.

16. The method of claim 15, wherein the step of setting boundary condition comprises the steps of:
denoting B as a discrete boundary in a region R; and
computing $$U\bigg|_{(x, y) \in S} = B1(x, y), \quad \frac{\partial U}{\partial S}\bigg|_{(x, y) \in S} = B2(x, y) \quad (7)$$

where S is a continuous boundary defined on the discrete boundary B, and B1(x, y) and B2(x, y) are the continuous function and differentiable function defined on the boundary S, respectively.

17. The method of claim 1, wherein the step of determining simultaneous difference equations comprises the steps of:
integralizing the image to produce a group of integral points within a region R and an integral boundary IB;
discretizing the image based on the mesh points for numerating the partial differential equation and a boundary condition; and
transforming the discretizied image by solving each mesh point in the image to determine the simultaneous difference equations.

18. The method of claim 17, wherein the step of integralizing comprises the steps of:
denoting two directions of the coordinate axes of the fingerprint image as X-direction and Y-direction; and
along the X-direction and Y-direction, computing integral points at a desired step length H as follow $$X(I)=X0+I*H, I=0, 1, 2 \ldots, W(F), \quad (8a)$$

$$Y(J)=Y0+J*H, J=0, 1, 2 \ldots, H(F), \quad (8b)$$

where, (X0, Y0) is top left point of the image, W(F) is the width of the image and H(F) is the height of the image.

19. The method of claim 17, wherein the step of discretizing comprises the steps of:
computing the derivatives in the partial differential equation $$A1\frac{\partial^2 U}{\partial X^2} + A2\frac{\partial^2 U}{\partial X\partial Y} + A3\frac{\partial^2 U}{\partial Y^2} + A4\frac{\partial U}{\partial X} + A5\frac{\partial U}{\partial X} + A6*U = 0 \quad (1)$$

with respect to each inner mesh point as $$\frac{\partial U}{\partial X} \approx [U(X + H, Y) - U(X, Y)]/H \quad (9a)$$

$$\frac{\partial U}{\partial Y} \approx [U(X, Y + H) - U(X, Y)]/H \quad (9b)$$

$$\frac{\partial^2 U}{\partial X^2} \approx [U(X + H, Y) - 2 * U(X, Y) + U(X - H, Y)]/(H*H) \quad (9c)$$

-continued $$\frac{\partial^2 U}{\partial Y^2} \approx [U(X, Y+H) - 2*U(X, Y) + U(X, Y-H)]/(H*H) \tag{9d}$$

$$\frac{\partial^2 U}{\partial X \partial X} \approx [U(X+H, Y+H) - U(X+H, Y) - U(X, Y+H) + U(X, Y)]/(H*H) \tag{9e}$$

where (X, Y) is inner mesh point in region R, IMP(R); discretizing the boundary condition $$U\Big|_{(x,y)\in S} = B1(x, y), \quad \frac{\partial U}{\partial s}\Big|_{(x,y)\in S} = B2(x, y); \text{ and} \tag{7}$$

combining the numerical derivatives of the partial differential equation and numerical boundary condition.

20. The method of claim 19, wherein the step of discretizing the boundary condition comprises the steps of:
  replacing the continuous function U(X, Y) in the boundary condition with discrete function F(I, J), wherein (I, J) is inner mesh point of a region in the image;
  replacing the continuous function B1(x, y) in the boundary condition with a numerical function according to $$D1(X,Y)=f1*F(X,Y)+f2, (X,Y)\in IB \tag{10}$$

where f1 and f2 are constants that are predetermined according to brightness and contrast of the image, and F(X, Y) is the gray value at point (X, Y) on the integral boundary IB; and
  replacing the continuous function B2(x, y) in the boundary condition with a numerical function according to $$D2(X,Y)=f1*[F(X1,Y1)-F(X,Y)]/h, (X,Y)\in IB \; h=\text{sqrt}((X1-X)*(X1-X)+(Y1-Y)*(Y1-Y)); \tag{11}$$

where (X1, Y1) is an integral point on IB selected as the next adjacent point along the boundary line IB.

21. The method of claim 1, wherein the step of mapping the solutions comprises the steps of:
  for each region R, computing minimum value min (R) and maximum value max (R) in the solution;
  computing ratio value r (R)=255/(max (R)−min(R));
  for each point (I, J) in the region R, assigning v(I, J)* 3 as the solution at point (I, J);
  computing W(I, J)=r(R)*(v(I, J)−min(R)) as the mapping of w(I, J) into gray level byte at the position (I, J); and
  enhancing the region R is by placing the value W(I, J) at position (I, J).

22. A method performed by a computer for extracting features from an image, the method comprising the steps of:
  establishing a mathematical model according to regional conditions in the image;
  converting the mathematical model into numerical equations;
  solving the numerical equations; and
  mapping respective values of the solutions of the numerical equations to respective regions of the image, wherein the step of establishing a mathematical model comprises the steps of:
  forming a partial differential equation;
  calculating a plurality of intrinsic properties of the image according to image ridge pattern;
  mapping the plurality of intrinsic properties into coefficients of the partial differential equation; and
  determining a boundary condition for the partial differential equation from the image to establish a relationship between properties of the image and the partial differential equation.

23. The method of claim 22, wherein the step of determining boundary condition comprises the steps of:
  drawing a close boundary within the image; and
  setting boundary condition on the drawn boundary.

24. The method of claim 23, wherein the step of setting boundary condition comprises the steps of:
  denoting B as a discrete boundary in a region R; and
  computing $$U\Big|_{(x,y)\in S} = B1(x, y), \quad \frac{\partial U}{\partial s}\Big|_{(x,y)\in S} = B2(x, y) \tag{7}$$

where S is a continuous boundary defined on the discrete boundary B, and B1(x, y) and B2(x, y) are the continuous function and differentiable function defined on the boundary S, respectively.

25. The method of claim 22, wherein the step of mapping respective values of the solutions comprises the steps of:
  for each region R in the image, computing minimum value min (R) and maximum value max (R) in the solution;
  computing ratio value r (R)=255/(max (R)−min(R));
  for each point (I, J) in the region R, assigning v(I, J)* 3 as the solution at point (I, J);
  computing W(I, J)=r(R)*(v(I, J)−min(R)) as the mapping of w(I, J) into gray level byte at the position (I, J); and
  enhancing the region R is by placing the value W(I, J) at position (I, J).

26. The method of claim 22, wherein the image is one or more of a fingerprint image, a facial image, a hand-palm image, an eye iris, an eye retina, and a texture image.

27. A digital signal processor (DSP) having stored thereon a set of instructions including instructions for generating geometric pattern from an image having a plurality of ridges and mesh points, when executed, the instructions cause the DSP to perform the steps of:
  forming a partial differential equation by transferring values for positions in the image to corresponding coefficients of the partial differential equation;
  determining simultaneous difference equations corresponding to the partial differential equation and the image mesh points;
  solving the simultaneous difference equations; and
  mapping the solutions of the simultaneous difference equations to respective positions on the image to determine features of the image.

28. The DSP of claim 27, wherein the step of forming a partial differential equation comprises the steps of:
  determining initial conditions for the partial differential equation; and
  determining boundary condition for the partial differential equation.

29. The DSP of claim 28, wherein the step of determining initial conditions comprises the steps of:
  normalizing the image to reduce variations in gray-level values along ridges of the image;
  estimating property values the image; and
  mapping the estimated property values into weight coefficients of the partial differential equation.

30. The DSP of claim 29, wherein the step of normalizing comprises the steps of:

determining M, mean of the gray-level in a region R by computing $$M = (1/N) \sum_{(I,J)\in R} \sum F(I, J) \qquad (2a)$$

where N is total number pixels in the region R; F(I, J) is gray value of the image at point (I, J);
determining V, variance of the region R by computing $$V = (1/N) \sum \sum_{(I,J)\in R} (F(I, J) - M(F)) * (F(I, J) - M(F)); \qquad (2b)$$

and
determining a normalized region R by computing $R(I,J)=m+\text{sqrt}((v*(F(I,J)-M)*(F(I,J)-M))/V)$, if $(I,J)>M$; $R(I,J)=m-\text{sqrt}((v*(F(I,J)-M)*(F(I,J)-M))/N)$, otherwise (2c)

where m and v are the desired mean and variance values, respectively.

31. The DSP of claim 29, wherein the step of estimating property values comprises the steps of:
dividing a region R into blocks of size b*b as B(k);
computing gradients at each pixel in R as $\partial x(I,J)=(p1*F(I-d,J)+p2*F(I,J)+p3*F(I+d,J))/p,$
$\partial y(I,J)=(p1*F(I,J-d)+p2*F(I,J)+p3*F(I,J+d))/p$ (3a)

where (I, J) and (I, J) are the gradient magnitude in x and y directions at pixel (I, J) of the image respectively, p1, p2 are positive numbers, p3 is negative number, and d is a constant expressed as step of the gradients p=p1+p2+p3;
estimating local orientation of each block (B(k)) centered at pixel (I, J) by computing $$\xi x(I, J) = \sum \sum_{(u,v)\in B(k)} 2*\partial x(u, v)*\partial y(u, v), \qquad (3b)$$

$$\zeta y(I, J) = \sum \sum_{(u,v)\in B(k)} (\partial\partial x(u, v)*\partial\partial y(u, v)), \qquad (3c)$$

$$\theta(I, J) = (1/2)\text{atan}\{\xi x(I, J)/\zeta y(I, J)\} \qquad (3d)$$

Where is an estimate of the local ridge orientation at the block centered at pixel (I, J);
computing ridge oriental vector as $$P = (1/n) \sum_{(I,J)\in R} \cos(2*\theta(I, J)) \qquad (4a)$$

$$Q = (1/n) \sum_{(I,J)\in R} \sin(2*\theta(I, J)) \qquad (4b)$$

Where P and Q are first and second components of the ridge oriental vector, respectively, and n is the total number of pixels calculated at the local region R;
for each block centered at pixel (I, J), computing the minimal value and maximal value the pixel;
for each block centered at pixel (I, J), computing a sequence of pixels seq(I, J) that take minimal and maximal value along the direction (a, b), where (a, b) is orthogonal vector of the main oriental vector (p, q);
computing freq(I, J), frequency of seq(I, J) at each block centered at pixel (I, J) according to the differential value between connected elements in seq(I, J); and
estimating a local ridge frequency W by computing $$W = (1/K) \sum_{(u,v)\in wnd(I,J)} \sum \text{freq}(u, v). \qquad (5)$$

32. The DSP of claim 29, wherein the step of mapping comprises the step of determining weight coefficients, A1, A2, A3, A4, A5 and A6 of a partial differential equation $$A1\frac{\partial^2 U}{\partial X^2} + A2\frac{\partial^2 U}{\partial X \partial Y} + A3\frac{\partial^2 U}{\partial Y^2} + A4\frac{\partial U}{\partial X} + A5\frac{\partial U}{\partial Y} + A6*U = 0 \qquad (1)$$

by computing $A1=P*P*(P*P+Q*Q)*W*W,$ (6a)

$A2=2*(\text{sqrt}(u*u-P*P*W*W)*\text{sqrt}(v-Q*Q*W*W))/W,$ (6b)

$A3=Q*Q(P*P+Q*Q)*W*W,$ (6c)

$A4=u*q+v,$ (6d)

$A5=-v*p-u,$ and (6e)

$A6=a*(P*P+Q*Q)+b$ (6f)

where a, b, u, v are constants.

33. The DSP of claim 28, wherein the step of determining boundary condition comprises the steps of:
drawing a close boundary within the image; and
setting boundary condition on the drawn boundary.

34. The DSP of claim 33, wherein the step of setting boundary condition comprises the steps of:
denoting B as a discrete boundary in a region R; and
computing $$U\bigg|_{(x,y)\in S} = B1(x, y), \quad \frac{\partial U}{\partial s}\bigg|_{(x,y)\in S} = B2(x, y) \qquad (7)$$

where S is a continuous boundary defined on the discrete boundary B, and B1(x, y) and B2(x, y) are the continuous function and differentiable function defined on the boundary S, respectively.

35. The DSP of claim 27, wherein the step of determining simultaneous difference equations comprises the steps of:
integralizing the image to produce a group of integral points within a region R and an integral boundary IB;
discretizing the image based on the mesh points for numerating the partial differential equation and a boundary condition; and
transforming the discretizied image by solving each mesh point in the image to determine the simultaneous difference equations.

36. The DSP of claim 35, wherein the step of integralizing comprises the steps of:
denoting two directions of the coordinate axes of the fingerprint image as X-direction and Y-direction; and along the X-direction and Y-direction, computing integral points at a desired step length H as follow $$X(I)=X0+I*H, I=0, 1, 2, \ldots, W(F), \quad (8a)$$

$$Y(J)=Y0+J*H, J=0, 1, 2, \ldots, H(F), \quad (8b)$$

where, (X0, Y0) is top left point of the image, W(F) is the width of the image and H(F) is the height of the image.

37. The DSP of claim 35, wherein the step of discretizing comprises the steps of:
computing the derivatives in the partial differential equation $$A1\frac{\partial^2 U}{\partial X^2} + A2\frac{\partial^2 U}{\partial X \partial Y} + A3\frac{\partial^2 U}{\partial Y^2} + A4\frac{\partial U}{\partial X} + A5\frac{\partial U}{\partial Y} + A6*U = 0 \quad (1)$$

with respect to each inner mesh point as $$\frac{\partial U}{\partial X} \approx [U(X+H, Y) - U(X, Y)]/H \quad (9a)$$

$$\frac{\partial U}{\partial Y} \approx [U(X, Y+H) - U(X, Y)]/H \quad (9b)$$

$$\frac{\partial^2 U}{\partial X^2} \approx [U(X+H, Y) - 2*U(X, Y) + U(X-H, Y)]/(H*H) \quad (9c)$$

$$\frac{\partial^2 U}{\partial Y^2} \approx [U(X, Y+H) - 2*U(X, Y) + U(X, Y-H)]/(H*H) \quad (9d)$$

$$\frac{\partial^2 U}{\partial X \partial X} \approx [U(X+H, Y+H) - U(X+H, Y) - U(X, Y+H) + U(X, Y)]/(H*H) \quad (9e)$$

where (X, Y) is inner mesh point in region R, IMP(R); discretizing the boundary condition $$U\Big|_{(x,y)\in S} = B1(x, y), \quad \frac{\partial U}{\partial s}\Big|_{(x,y)\in S} = B2(x, y); \quad \text{and} \quad (7)$$

combining the numerical derivatives of the partial differential equation and numerical boundary condition.

38. The DSP of claim 37, wherein the step of discretizing the boundary condition comprises the steps of:
replacing the continuous function U(X, Y) in the boundary condition with discrete function F(I, J), wherein (I, J) is inner mesh point of a region in the image;
replacing the continuous function B1(x, y) in the boundary condition with a numerical function according to $$D1(X,Y)=f1*F(X,Y)+f2, (X,Y)\in IB \quad (10)$$

where f1 and f2 are constants that are predetermined according to brightness and contrast of the image, and F(X, Y) is the gray value at point (X, Y) on the integral boundary IB; and
replacing the continuous function B2(x, y) in the boundary condition with a numerical function according to $$D2(X,Y)=f1*[F(X1,Y1)-F(X,Y)]/h, (X,Y)\in IB \; h=\text{sqrt}$$
$$((X1-X)*(X1-X)+(Y1-Y)*(Y1-Y)); \quad (11)$$

where (X1, Y1) is an integral point on IB selected as the next adjacent point along the boundary line IB.

39. The DSP of claim 27, wherein the step of mapping the solutions comprises the steps of:
for each region R, computing minimum value min (R) and maximum value max (R) in the solution;
computing ratio value r (R)=255/(max (R)−min (R));
for each point (I, J) in the region R, assigning v(I, J)*3 as the solution at point (I, J);
computing W(I, J)=r(R)*(v(I, J)−min(R)) as the mapping of w(I, J) into gray level byte at the position (I, J); and
enhancing the region R is by placing the value W(I, J) at position (I, J).

40. The DSP of claim 27, wherein the image is one or more of a finger print, a facial image, a hand-palm image, an eye iris, an eye retina, and a texture image.

41. A method performed by a computer for biometric image processing, the DSP comprising the steps of:
establishing numerical relationship between visual appearance of the biometric image and a partial differential equation model of the image; and
approximating solutions of the partial differential equation with a boundary condition according to the established numerical relationship to determine features of the biometric image, wherein the step of approximating solutions comprises the steps of:
integralizing the image to produce a group of integral points within a region R and an integral boundary IB;
discretizing the image based on mesh points for numerating a partial differential equation and a boundary condition;
transforming the discretizied image by solving each mesh point in the image to determine the simultaneous difference equations;
replacing the continuous function U(X, Y) in the boundary condition with discrete function F(I, J), wherein (I, J) is inner mesh point of a region in the image;
replacing the continuous function B1(x, y) in the boundary condition with a numerical function according to $$D1(X,Y)=f1*F(X,Y)+f2, (X,Y)\in IB \quad (10)$$

where f1 and f2 are constants that are predetermined according to brightness and contrast of the image, and F(X, Y) is the gray value at point (X, Y) on the integral boundary IB; and
replacing the continuous function B2(x, y) in the boundary condition with a numerical function according to $$D2(X,Y)=f1*[F(X1,Y1)-F(X,Y)]/h, (X,Y)\in IB \; h=\text{sqrt}$$
$$((X1-X)*(X1-X)+(Y1-Y)*(Y1-Y)); \quad (11)$$

where (X1, Y1) is an integral point on IB selected as the next adjacent point along the boundary line IB.

42. The method of claim 41, wherein the step of integralizing comprises the steps of:
denoting two directions of the coordinate axes of the fingerprint image as X-direction and Y-direction; and
along the X-direction and Y-direction, computing integral points at a desired step length H as follow $$X(I)=X0+I*H, I=0, 1, 2, \ldots, W(F), \quad (8a)$$

$$Y(J)=Y0+J*H, J=0, 1, 2, \ldots, H(F), \quad (8b)$$

where, (X0, Y0) is top left point of the image, W(F) is the width of the image and H(F) is the height of the image.

43. The method of claim 41, wherein the step of discretizing comprises the steps of:

computing the derivatives in the partial differential equation $$A1\frac{\partial^2 U}{\partial X^2} + A2\frac{\partial^2 U}{\partial X \partial Y} + A3\frac{\partial^2 U}{\partial Y^2} + A4\frac{\partial U}{\partial X} + A5\frac{\partial U}{\partial Y} + A6 * U = 0 \quad (1)$$

with respect to each inner mesh point as $$\frac{\partial U}{\partial X} \approx [U(X+H, Y) - U(X, Y)]/H \quad (9a)$$

$$\frac{\partial U}{\partial X} \approx [U(X, Y+H) - U(X, Y)]/H \quad (9b)$$

where (X, Y) is inner mesh point in region R, IMP(R); discretizing the boundary condition $$U\Big|_{(x,y)\in S} = B1(x, y), \quad \frac{\partial U}{\partial s}\Big|_{(x,y)\in S} = B2(x, y); \quad \text{and} \quad (7)$$

combining the numerical derivatives of the partial differential equation and numerical boundary condition.

44. The method of claim 41, wherein the step of discretizing the boundary condition comprises the steps of:

replacing the continuous function U(X, Y) in the boundary condition with discrete function F(I, J), wherein (I, J) is inner mesh point of a region in the image;

replacing the continuous function B1(x, y) in the boundary condition with a numerical function according to $$D1(X, Y) = f1 * F(X, Y) + f2, (X, Y) \in IB \quad (10)$$

where f1 and f2 are constants that are predetermined according to brightness and contrast of the image, and F(X, Y) is the gray value at point (X, Y) on the integral boundary IB; and replacing the continuous function B2(x, y) in the boundary condition with a numerical function according to $$D2(X, Y) = f1 * [F(X1, Y1) - F(X, Y)]/h, (X, Y) \in IB \ h = \text{sqrt} \\ ((X1-X)*(X1-X) + (Y1-Y)*(Y1-Y)); \quad (11)$$

where (X1, Y1) is an integral point on IB selected as the next adjacent point along the boundary line IB.

45. The method of claim 41, further comprising the step of mapping the solutions of the partial differential equation to respective positions on the image to determine features of the image.

46. The method of claim 45, wherein the step of mapping the solutions comprises the steps of:

for each region R, computing minimum value min (R) and maximum value max (R) in the solution;

computing ratio value r (R)=255/(max(R)−min(R));

for each point (I, J) in the region R, assigning v(I, J)*3 as the solution at point (I, J);

computing W(I, J)=r(R)*(v(I, J)−min(R)) as the mapping of w(I, J) into gray level byte at the position (I, J); and enhancing the region R is by placing the value W(I, J) at position (I, J).

47. The method of claim 41, wherein the image is one or more of a finger print, a facial image, a hand-palm image, an eye iris, an eye retina, and a texture image.

\* \* \* \* \*

UNITED STATES PATENT AND TRADEMARK OFFICE
CERTIFICATE OF CORRECTION

PATENT NO.        : 7,020,591 B1
APPLICATION NO.   : 10/047535
DATED             : March 28, 2006
INVENTOR(S)       : Wei et al.

It is certified that error appears in the above-identified patent and that said Letters Patent is hereby corrected as shown below:

In the Drawings

FIG. 1, Sheet 1 of 14              Delete Drawing Sheet 1 and substitute therefore the Drawing Sheet, consisting of Fig. 1, as shown on the attached page

In the Claims

Column 14, line 19, Claim 9        Delete "items",
                                   Insert --item--

Column 14, line 59, Claim 12       Delete "tm"

Column 15, line 37, Claim 13       After "maximal value",
                                   Insert --of--

Column 16, line 31, Claim 17       Delete "discretizied",
                                   Insert --discretized--

Column 17, line 16, Claim 19       Delete "$\partial$s"
                                   Insert --$\partial$S--

Column 18, line 16, Claim 24       Delete "$\partial$s"
                                   Insert --$\partial$S--

Column 18, line 63, Claim 29       After "property values",
                                   Insert --of--

Column 19, line 65, Claim 31       After "maximal value",
                                   Insert --of--

Column 20, line 46, Claim 34       Delete "$\partial$s"
                                   Insert --$\partial$S--

UNITED STATES PATENT AND TRADEMARK OFFICE
CERTIFICATE OF CORRECTION

PATENT NO. : 7,020,591 B1
APPLICATION NO. : 10/047535
DATED : March 28, 2006
INVENTOR(S) : Wei et al.

It is certified that error appears in the above-identified patent and that said Letters Patent is hereby corrected as shown below:

| | |
|---|---|
| Column 20, line 60, Claim 35 | Delete "discretizied", Insert --discretized-- |
| Column 21, line 44, Claim 37 | Delete "$\partial s$" Insert --$\partial S$-- |
| Column 22, line 30, Claim 41 | Delete "discretizied", Insert --discretized-- |
| Column 23, line 25, Claim 43 | Delete "$\partial s$" Insert --$\partial S$-- |

Signed and Sealed this

Seventeenth Day of June, 2008

JON W. DUDAS
*Director of the United States Patent and Trademark Office*